(12) United States Patent
Yost

(10) Patent No.: US 11,061,421 B2
(45) Date of Patent: Jul. 13, 2021

(54) METHOD AND SYSTEM FOR DETERMINING PRODUCT FRESHNESS

(71) Applicant: AVERY DENNISON RETAIL INFORMATION SERVICES, LLC, Mentor, OH (US)

(72) Inventor: Ryan Yost, Mason, OH (US)

(73) Assignee: Avery Dennison Retail Information Services, LLC, Mentor, OH (US)

( * ) Notice: Subject to any disclaimer, the term of this patent is extended or adjusted under 35 U.S.C. 154(b) by 0 days.

(21) Appl. No.: 16/258,572

(22) Filed: Jan. 26, 2019

(65) Prior Publication Data
US 2019/0235538 A1 Aug. 1, 2019

Related U.S. Application Data

(60) Provisional application No. 62/622,484, filed on Jan. 26, 2018.

(51) Int. Cl.
| | |
|---|---|
| *G08B 21/00* | (2006.01) |
| *G05D 23/19* | (2006.01) |
| *G06Q 10/08* | (2012.01) |
| *B65C 9/46* | (2006.01) |

(Continued)

(52) U.S. Cl.
CPC ........... *G05D 23/1917* (2013.01); *B65C 9/46* (2013.01); *G01K 1/022* (2013.01); *G01N 31/229* (2013.01); *G06Q 10/08* (2013.01); *G06Q 10/0832* (2013.01)

(58) Field of Classification Search
CPC ...... G05D 23/1917; B65C 9/46; G01K 1/022; G01N 31/229; G06Q 10/08; G06Q 10/0832
See application file for complete search history.

(56) References Cited

U.S. PATENT DOCUMENTS

| 9,121,840 B2 * | 9/2015 | Minvielle | ............... A23L 3/001 |
| 10,219,531 B2 * | 3/2019 | Minvielle | ................. A23L 3/00 |

(Continued)

FOREIGN PATENT DOCUMENTS

WO 2013/188356 12/2013

OTHER PUBLICATIONS

International Search Report and Written Opinion dated Apr. 29, 2019 issued in corresponding IA No. PCT/US2019/015314 filed Jan. 26, 2019.

*Primary Examiner* — Phung Nguyen

(57) ABSTRACT

The method and system can include freezer and refrigeration units that are equipped with thermostats or modules for controlling and monitoring the temperatures inside the units. The thermostats may be communicatively coupled to a printer used for inventory labeling and date information. The thermostats may also include a variety of alarms that may be triggered. The method and system may provide a label that shows that any food products stored in the refrigeration and freezer units was maintained at a predetermined or desired temperature range during the storage period. The label can thus provide an indicator of "freshness" where one or more indicia may be printed thereon showing that the food product was properly stored, a temperature range during the storage period, duration of the storage period, expected shelf life of the food product, and the like.

19 Claims, 2 Drawing Sheets

(51) Int. Cl.
*G01K 1/022* (2021.01)
*G01N 31/22* (2006.01)

(56) References Cited

U.S. PATENT DOCUMENTS

| | | | | |
|---|---|---|---|---|
| 2004/0100380 | A1* | 5/2004 | Lindsay | G06K 19/0717 |
| | | | | 340/540 |
| 2004/0148117 | A1 | 7/2004 | Kirshenbaum et al. | |
| 2005/0261991 | A1* | 11/2005 | Kennamer | G06Q 10/087 |
| | | | | 705/28 |
| 2006/0213904 | A1* | 9/2006 | Kates | B65D 79/02 |
| | | | | 219/702 |
| 2008/0186175 | A1 | 8/2008 | Stern | |
| 2009/0029016 | A1* | 1/2009 | Pfister | G07F 17/0071 |
| | | | | 426/231 |
| 2009/0303052 | A1* | 12/2009 | Aklepi | G06Q 10/08 |
| | | | | 340/573.2 |
| 2012/0009872 | A1 | 1/2012 | Lane et al. | |
| 2013/0025303 | A1* | 1/2013 | Yoon | F25C 5/08 |
| | | | | 62/89 |
| 2013/0080784 | A1* | 3/2013 | Oertli | G06F 21/64 |
| | | | | 713/175 |
| 2017/0365017 | A1* | 12/2017 | Ells | G06Q 20/3278 |
| 2018/0189747 | A1* | 7/2018 | Best | G06K 17/0025 |
| 2018/0209901 | A1* | 7/2018 | Schwartzer | G01N 21/3563 |
| 2018/0224150 | A1* | 8/2018 | Lewis | F24F 11/49 |

* cited by examiner

METHOD AND SYSTEM FOR DETERMINING PRODUCT FRESHNESS

CROSS-REFERENCE TO RELATED APPLICATION(S)

The present application claims priority to and the benefit of U.S. provisional application No. 62/622,484 filed Jan. 26, 2018, which is incorporated herein by reference in its entirety.

BACKGROUND

The shipping and storage of food products is critical to providing food retailers, such as grocery and convenience stores, distributors, restaurants and processors with food and other consumable products that will ultimately be used and or consumed by a consumer or end user. Food, food products and consumable products are gathered, refined, processed and stored, as appropriate. For many types of perishable food and consumable products, this includes refrigerating or freezing, maintaining humidity levels and the like, so that the food and consumable products are maintained at a proper temperature, etc. so that they will be fresh and available for their intended use or sale upon delivery to the designated outlet, e.g. grocery or restaurant.

However, despite food or consumable products being packaged and stored with the intent of refrigeration or freezing, there is no known manner of tracking this other than manually checking thermometers or other gauges. Power outages, equipment failures, delays in sorting or packaging, labor issues, or higher than typical ambient temperatures during necessary movement of the food and consumable products from, for example, a refrigerated shipping container to a refrigerated storage unit or facility can result in decreases in food quality, lack of freshness of the food or consumable products, or spoilage. For example, food products being shipped in a refrigerated container on a truck could face a decrease in freshness or quality as a result of a temporary failure of the refrigeration unit or excessively high ambient temperatures that result in the refrigeration unit not being able to cool to an effective temperature. However, in such situations, there is no known manner, other than potential visual or olfactory inspections, to determine that there was a lack of refrigeration or that the food products may not have a desired freshness. Further, due to the packaging of food that is shipped, visual or olfactory inspections of food are often impossible until the food product is ultimately unpacked and opened for use or consumption. Additionally, there is often no known or reliable manner to determine the location or reason for spoilage of food, such as whether it spoiled during shipping, handling or storage following delivery.

SUMMARY

The present invention relates to a method and system for tracking the temperatures in refrigeration and/or freezer units. The method and system can include freezer and refrigeration units that are equipped with thermostats or modules for controlling and monitoring the temperatures inside the units. The thermostats may be communicatively coupled to a printer used for inventory labeling and containing date information as well as recipe, ingredient or other data necessary for food preparation, storage or handling. The thermostats may also include a variety of alarms that may be triggered as a result of temperatures in the units falling outside of a predetermined or desired range, or if elements of the system go offline. The modules can be further used to determine humidity or other environmental conditions which may be relevant to the food products being monitored.

The method and system may produce or provide a label that shows that designated food or consumable products which were stored in the refrigeration and freezer units were maintained at a predetermined or desired temperature or environmental range during the storage period. The label can thus provide an indicator of "freshness" or viability where one or more indicia may be printed thereon showing that the food or consumable product was properly stored, a temperature or environmental range, such as humidity, gas levels, spore levels and light during the storage period, duration of the storage period, expected shelf life of the food product, and the like. The label can be attached or adhered to the food or consumable product, to the container or package or to another record member for verification.

A system for use in determining food freshness or viability, including a perishable food or consumable product and a refrigeration unit for holding the food product. A module is provided in the refrigeration unit for monitoring an environmental condition and transmitting information about the environmental condition. The system also includes a printer containing data relating to the food or consumable product and the printer is connected to the module and for receiving information transmitted by the module. A printable medium is used for receiving indicia from the printer relating to the information received from the module and the printer with information received from the modules producing a freshness record for the food or consumer product.

BRIEF DESCRIPTION OF THE FIGURES

Advantages of embodiments of the present invention will be apparent from the following detailed description of the exemplary embodiments thereof, which description should be considered in conjunction with the accompanying drawings in which like numerals indicate like elements, in which.

DETAILED DESCRIPTION

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description discussion of several terms used herein follows.

As used herein, the word "exemplary" means "serving as an example, instance or illustration." The embodiments described herein are not limiting, but rather are exemplary only. It should be understood that the described embodiments are not necessarily to be construed as preferred or advantageous over other embodiments. Moreover, the terms "embodiments of the invention", "embodiments" or "invention" do not require that all embodiments of the invention include the discussed feature, advantage or mode of operation.

According to an exemplary embodiment, and referring generally to the Figures, a method and system for monitoring the storage temperature or other environmental conditions, e.g. humidity, light, gas or spore levels, of food and consumable products and labeling the food products may be shown and described. The method and system can include a variety of elements, including a food storage container or package, a thermostat or module, a printer, and a scanning device which may be utilized to provide desired information. A food or consumable product that is stored in a storage container may thus have temperature information and other environmental conditions monitored and ultimately provided on a label or other record member that is printed and affixed to the food product or a container containing the food product to create a freshness record. This information may then be read by any of a variety of scanning devices to provide information regarding the temperature conditions when the food or consumable product was stored. The term "consumable product" applies to products such as nutraceuticals, supplements, vitamins, medicines or the like which are generally ingestible by a human being.

Figure 1:
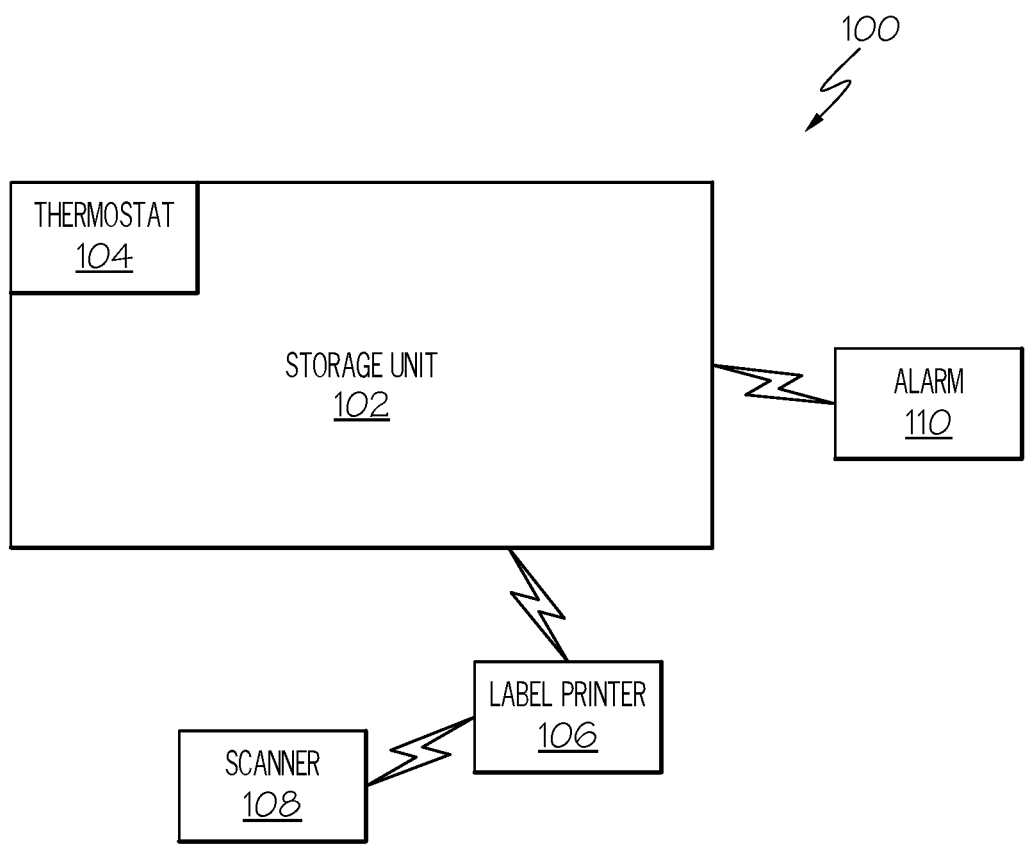
FIG. 1 shows an exemplary diagram of a method and system to monitor food product storage.

Referring now to exemplary FIG. 1, a system 100 for temperature monitoring to determine food product freshness may be shown. System 100 can include a food storage unit 102. Storage unit 102 can be any known refrigeration or freezing storage device or unit and may be any size, including industrial sized units, commercial units, and consumer units. Storage units may also include other cool storage, dry storage or other environmental storage areas such as for fruit or vegetables where one may want to monitor fruit ripening (e.g. capturing the amount of gas being emitted by the fruit, such as ethylene) or rotting or other food packages. Storage unit 102 may be equipped with a thermostat, sensor or environmental module 104. Thermostat 104 may provide a first function as a typical thermostat, for example to maintain a desired temperature inside storage unit 102 using known cooling (and/or heating) elements. The thermostat or module may further include other environmental sensors to detect light, humidity, certain gases or spore production from bacteria or fungus. Thermostat 104 may further be communicatively coupled to label printer 106, such as a FRESH-MARX® printer available from Avery Dennison Printer Systems Division of Miamisburg, Ohio and alarm system 110. It may be appreciated that thermostat or module 104 may be communicatively coupled to printer 106, alarm system 110, and any other elements, such as heating and cooling control elements (not pictured) in a wired or wireless fashion. For example, the printer could provide the food storage area to increase or decrease a particular environmental condition, heating or cooling, light levels, humidity, etc.

Thermostat or module 104 may function as a typical thermostat or environmental monitor, as noted above. However, thermostat 104 may also provide a continuous monitoring and reporting of temperatures or environmental conditions inside storage unit 102. For example, thermostat 104 may send data or other information to label printer 106 indicating that the temperature or environmental condition inside storage unit 102 has been maintained in an appropriate range, such as with temperature within 1-2 degrees C. for a predetermined amount of time. Thermostat or module 104 may be set to report a temperature range or other environmental condition at any desired time intervals, at the time of a triggering event, such as the opening or closing of storage unit 102, following the stocking or removal of food product from storage unit 102, when thermostat 104 is adjusted, upon a triggering event such as a change in temperature outside of a predetermined range, or as a result of another triggering event, as desired. Additionally, when some triggering events occur, thermostat, sensor or module 104 may also send a signal to an alarm system 110 or other notification device to trigger a response. Upon receipt of such a signal, alarm system 110 may provide any desired form of audio or visual alarm, or send a communication to another device, such as a computer, phone, or smart phone so that an appropriate party may attend to the alarm and its cause and take corrective action. Alarm system 110 may also be such that when an alarm is received, the alarm system 110 can reset storage unit 102 to a desired or predetermined temperature or environmental condition or otherwise reset thermostat 104 and/or any associated cooling or heating hardware to resolve or troubleshoot the problem caused by the alarm.

In a further exemplary embodiment, food products may be stored in a storage unit 102. Storage unit 102 may be a cooled or refrigerated unit, for example with thermostat 104 set to about 2 degrees C. to cool the food products therein. If the temperature is maintained at or about that temperature during the duration of the food storage, thermostat 104 may transmit such data to label printer 106 (and any associated computer or processing element associated therewith). The transmitted data can indicate that the food product was stored at a constant or desired temperature, provide the temperature range of the storage unit 102 during which the food product was stored, provide an average temperature, provide a target "sell by" date, or provide some other indication of proper storage, such as stating "FRESH" or similar language, providing an alphabetical or numerical grade of known or perceived freshness of the food product, or the like. This data can then be encoded in any of a variety of manners and printed on a label. The encoding can be done in the form of printing the data in a regular language, printing a barcode or other code, encoding an RFID tag with the data, a combination thereof, where data is encoded in a RFID tag and printed on a label or other record member which accompanies the RFID tag, or any other desired methodology. The encoded information can also match all or a portion of the printed information. Exemplary RFID tags are available from Avery Dennison RFID Company, of Glendale, Calif. The printed labels can then be applied to the food or consumable products as desired, for example by placing labels on containers or pallets of grouped food products, placing labels on individual food products, and the like.

In some other examples, if there is a variance in the temperature of storage unit 102 during the time when the food products are stored there, such information may also be conveyed and printed by label printer 106, which may be, but is not limited to a FRESHMARX® printer. For example, for food products that experienced a brief temperature variation outside (above or below) of a predetermined range, but which would be unlikely to affect the quality of the food or have a minimal effect on the quality of food, the label printer and associated logic and processor may provide a label that indicates a grade of "B" (on a standard "A" to "F") scale, a numerical grade, such as 9 on a scale of 10, some other internal coding or a shortened time period until a sell-by date as determined by an algorithm. It may be appreciated that other variances in temperature, environmental levels or storage conditions may result in decreased or increased scores, as appropriate. For example, if the food product was allowed to warm to an undesired temperature during storage in container unit 102 or cool to a freezing temperature when undesired, label printer may mark them with a grade of "D", "2/10", or indicate a sell-by date that is imminent. Other food product that is determined to be unfit for consumption may be marked as such, such as by printing black boxes or "X"s on the label or overstriking the information that has been printed.

It may be appreciated that the label printed by label printer 106 can be a pressure sensitive label or other record member that adheres to food or consumer product packaging or food products themselves, as desired. Further, in addition to temperature information or storage conditions, the label may provide standard inventory and dating information, as desired. Additionally, the labels may be utilized to provide ingredient information, allergy information, or any other appropriate consumer information.

The label affixed to the food product or products may then be scanned by scanner 108 to provide the information found on the label printed by label printer 106. Such information can then be utilized by a processing system or appropriate personnel to sort, distribute, display, further store, or dispose of the food product, as appropriate or desired.

Figure 2:
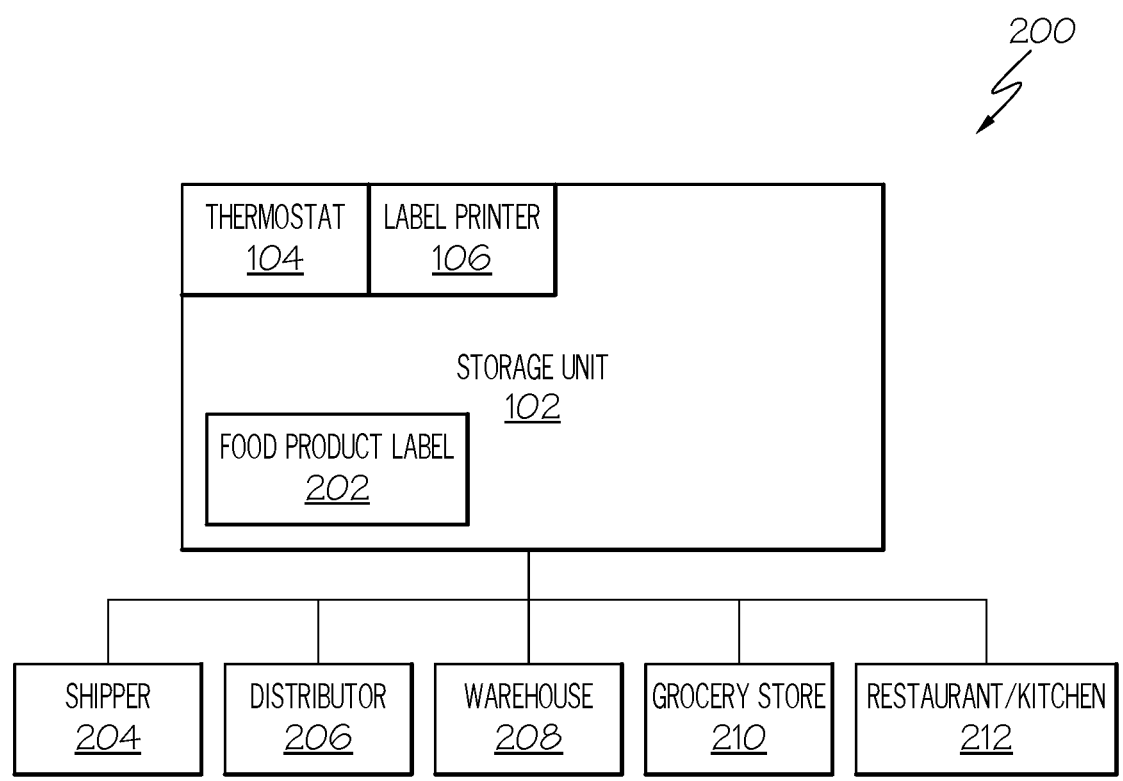
FIG. 2 shows another exemplary diagram of a method and system to monitor food product storage.

Referring now to exemplary FIG. 2, food product label 202 may be utilized and scanned in any of a variety of locations. For example, the label 202 may be affixed to a food product while it is stored in storage unit 102 before it is distributed. While in storage unit 102, label 202 can be scanned to provide inventory and freshness (product condition) information. When the food product is being prepared for transport, a shipping scan 204 can be made on label 202 to provide both inventory information and product freshness information. This can ensure quality in the shipping of the food products, ensure that the food product was in proper condition when it left the storage unit 102, and ensure that the food was shipped properly upon delivery to its next destination. For example, food products can be shipped to a distributor 206, wholesale warehouse 208, grocery or convenience store 210, and/or restaurant or kitchen 212. At each of these locations label 202 can be scanned to ensure freshness of the food products. In such exemplary embodiments, storage unit 102 can be a shipping container that is refrigerated or cooled, and which is transported with the food products stored therein. Alternatively, various storage units 102, thermostats 104, and label printers 106 may be used at different stages of the food product storage and distribution. For example, a first storage unit may be at an initial processing facility and provide a first label and "freshness" score, a second may be utilized by a shipping agency to provide a second label and score (for example affixed over the first label), a third may be utilized at a warehouse, distribution center, grocery store, restaurant, etc. to provide another label and score, and so on. Further, in some exemplary embodiments, label 202 may be updated at each or any of these stages to reflect any change information, or, if the conditions remain the same throughout transport, a single label may be utilized for all stages. The updating can occur through additional printed or encoded information. Further, storage unit 102 may have thermostat 104 and label printer 106 coupled thereto or integrally formed so that the food product is monitored continuously from its initial processing until it arrives at its ultimate destination for sale or consumption. Additionally, it is envisioned that storage unit 102 could be a refrigerator or refrigeration or freezer unit, such as a commercial refrigeration unit at a grocery store or restaurant, or even a consumer refrigeration or freezer unit, which can allow for the monitoring the food product via thermostat 104 and label printer 106 associated with that refrigeration or freezer unit.

Utilization of such a system as that shown in exemplary FIG. 2 can allow for enhanced quality control between various custodial agencies of the food products as well as assurances that food products that are ultimately prepared for consumption are fresh or have otherwise been stored in appropriate conditions. For example, if a food product is marked as "FRESH" (or an equivalent marking) at the initial storage unit 102, and then by shipping agency 204, but not by grocery store 210, it will be clear from a scan of label 202 that the food product was initially processed and stored properly, that it was shipped properly to the grocery store 210, but that grocery store 210 experienced a situation which caused a decrease in the "freshness" or score of the food product, as shown on label 202.

Additionally, in further examples, when food product must be disposed of, the label 202 can be scanned. This scan can provide important waste information that reflects if the food or consumable product was disposed of due to spoilage based on storage conditions, spoilage based on appropriate shelf life, or disposed of for other factors. Such information can then ultimately be utilized to provide economic data, predictive ordering data, waste data, and the like to the appropriate entity or entities.

In still further exemplary embodiments, the data printed on label(s) 202 may be stored in a database. The database may be located remotely from storage unit 102 and label printer 106 and may be, for example, cloud based. The data can be sortable and/or searchable, as desired, and may be accessed by other parties. For example, data generated during shipping 204 may be accessed by grocery store 210 so that they can track their inventory prior to delivery and ensure that the food product is fresh. Further, access to the data in the database can be restricted to certain parties or entities with appropriate privileges, as desired.

Additionally, scans of label 202 may assist in connecting food product data that could not previously be connected. For example, in a restaurant environment, food product and labels 202 associated therewith may be scanned upon receipt. However, such scans would not previously provide temperature or freshness information, nor would they allow for an automatic inventory update following the scan. Additionally, once scanned into inventory, the food products could be sorted (physically or via data) to show the freshness, shelf life, use-by or sell-by dates, and the like. Such information could also be used in conjunction with a food product ordering system or algorithm. In a kitchen hub environment, scanned labels 202 could provide for a further freshness check and also inventory update and control, as well as affect ordering. Further, such a scan in a kitchen environment could be utilized to ensure all food product attributes, such as the presence of allergens or certain ingredients, are monitored and controlled. Additionally, as noted above, the system may be utilized during waste management. Here, info regarding food product use, spoilage, actual cost of food product used versus that disposed of, and the like can be monitored and evaluated for efficiency or ordering purposes.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art (for example, features associated with certain configurations of the invention may instead be associated with any other configurations of the invention, as desired).

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A system for use in determining food freshness, comprising;
a storage unit for holding a food product;
a module for monitoring an environmental condition and transmitting information about the environmental condition, the module being positioned within the storage unit;
a printer containing data relating to the perishable food product, the printer being connected to the module and configured to receive information transmitted by the module;
a printable or encodable medium, the medium configured to receive data from the printer relating to the information received from the module; and
wherein the printer is configured to produce, based on information from the module, a freshness record for the food product including one of a range of scaled freshness grades based on a temperature variation of the storage unit.

2. The system of claim 1, wherein the data contained in the printer for the perishable food product includes recipe and ingredient information.

3. The system of claim 1, wherein the environmental condition includes temperature, light, humidity, and gas detection.

4. The system of claim 1, wherein the freshness record is one of a label, RFID tag or other record member.

5. The system of claim 1, wherein the printer includes a RFID encoder for encoding RFID devices.

6. The system of claim 1, wherein the storage unit is one of a cool storage, dry storage, refrigeration unit, freezer unit or other environmental chamber for holding food.

7. The system of claim 1, further comprising an alarm, wherein the alarm is connected to the module and configured to receive a signal from the module upon an occurrence of a triggering event.

8. The system of claim 1, further comprising a scanner configured to provide information contained in the freshness record.

9. A method for determining food freshness, comprising;
storing a perishable food product in a storage unit;
monitoring an environmental condition of the storage unit with a module positioned within the storage unit;
transmitting information about the environmental condition to a printer connected to the module;
transmitting data from the printer relating to the information about the environmental condition to a printable or encodable medium; and
based on the information about the environmental condition, producing a freshness record for the food product that includes one of a range of scaled freshness grades based on a temperature variation of the storage unit.

10. The method of claim 9, wherein the step of transmitting data from the printer includes transmitting data relating to recipe and ingredient information for the perishable food product.

11. The method of claim 9, wherein the step of monitoring the environmental condition includes monitoring one or more of a temperature, light, humidity, or gas detection.

12. The method of claim 9, wherein the step of producing the freshness record includes producing one or more of a label, RFID tag or other record member.

13. The method of claim 9, wherein the step of transmitting data from the printer includes encoding a RFID device with a RFID encoder of the printer.

14. The method of claim 9, wherein the step of storing the perishable food product includes storing the food product in a cool storage, dry storage, refrigeration unit, freezer unit or other environmental chamber for holding food.

15. The method of claim 9, further comprising transmitting a signal to an alarm connected to the module upon an occurrence of a triggering event.

16. The method of claim 15, further comprising transmitting a communication related to the triggering event from the alarm to one or more of a computer, phone, or smart phone.

17. The method of claim 15, further comprising the step of resetting the storage unit to a desired temperature or environmental condition.

18. The method of claim 9, further comprising scanning the freshness record.

19. The method of claim 18, further comprising processing the perishable food product based on information contained in the freshness record, where processing includes one or more of sorting, distributing, storing, or disposing of the perishable food product.

* * * * *